(12) United States Patent
Allen et al.

(10) Patent No.: US 11,866,269 B2
(45) Date of Patent: Jan. 9, 2024

(54) DYNAMIC PROCESSING OF OBJECTS PROVIDED IN ELEVATED VEHICLES WITH EVACUATION SYSTEMS AND METHODS FOR RECEIVING OBJECTS

(71) Applicant: Berkshire Grey Operating Company, Inc., Bedford, MA (US)

(72) Inventors: Thomas Allen, Reading, MA (US); Benjamin Cohen, Somerville, MA (US); John Richard Amend, Jr., Belmont, MA (US); Joseph Romano, Arlington, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

(21) Appl. No.: 17/953,982

(22) Filed: Sep. 27, 2022

(65) Prior Publication Data
US 2023/0104427 A1 Apr. 6, 2023

Related U.S. Application Data

(60) Provisional application No. 63/252,812, filed on Oct. 6, 2021.

(51) Int. Cl.
*B65G 67/30* (2006.01)
*B65G 43/08* (2006.01)
(Continued)

(52) U.S. Cl.
CPC ........... *B65G 43/08* (2013.01); *B65G 37/005* (2013.01); *B65G 67/40* (2013.01)

(58) Field of Classification Search
CPC ......... B65G 67/30; B65G 67/34; B65G 67/36
(Continued)

(56) References Cited

U.S. PATENT DOCUMENTS

| 3,721,354 A | 3/1973 | Raynes et al. |
| 3,734,286 A | 5/1973 | Simjian |
| (Continued) | | |

FOREIGN PATENT DOCUMENTS

| AU | 2006204622 A1 | 3/2007 |
| CA | 2985166 A1 | 12/2016 |
| (Continued) | | |

OTHER PUBLICATIONS

Non-Final Office Action issued by the United States Patent and Trademark Office in related U.S. Appl. No. 17/236,252 dated Mar. 10, 2023, 14 pages.

(Continued)

*Primary Examiner* — Joseph A Dillon, Jr.
(74) *Attorney, Agent, or Firm* — Gesmer Updegrove LLP

(57) ABSTRACT

A system is disclosed for receiving a plurality of objects from an elevated trailer of a tractor trailer. The system includes a collection conveyor extending between a base end and a coupled end, the coupled end being rotatably coupled to an evacuation conveyor, said collection conveyor including an object facing surface between the base end and the coupled end for receiving the plurality of objects, said collection conveyor being rotatably adjustable with respect to the evacuation conveyor at the coupled end, and both the evacuation conveyor and the coupled end of the collection conveyor being elevationally adjustable.

51 Claims, 11 Drawing Sheets

(51) Int. Cl.
*B65G 37/00* (2006.01)
*B65G 67/40* (2006.01)

(58) Field of Classification Search
USPC ........................................ 414/385, 582, 583
See application file for complete search history.

(56) References Cited

U.S. PATENT DOCUMENTS

| | | | |
|---|---|---|---|
| 3,779,405 A | 12/1973 | Kavanaugh, Jr. | |
| 4,186,836 A | 2/1980 | Wassmer et al. | |
| 4,253,791 A | 3/1981 | Van Drie | |
| 4,557,659 A | 12/1985 | Scaglia | |
| 4,722,653 A | 2/1988 | Williams et al. | |
| 4,759,439 A | 7/1988 | Hartlepp | |
| 4,776,742 A | 10/1988 | Felder | |
| 4,802,810 A | 2/1989 | Gunn | |
| 4,815,582 A | 3/1989 | Canziani | |
| 4,846,335 A | 7/1989 | Hartlepp | |
| 5,352,081 A | 10/1994 | Tanaka | |
| 5,460,271 A | 10/1995 | Kenny et al. | |
| 5,509,723 A * | 4/1996 | Bratlie .................. | B65G 67/30 298/17 SG |
| 5,595,263 A | 1/1997 | Pignataro | |
| 5,685,687 A | 11/1997 | Frye | |
| 5,764,013 A | 6/1998 | Yae | |
| 5,839,566 A | 11/1998 | Bonnet | |
| 6,011,998 A | 1/2000 | Lichti et al. | |
| 6,059,092 A | 5/2000 | Jerue et al. | |
| 6,076,023 A | 6/2000 | Sato | |
| 6,401,936 B1 | 6/2002 | Isaacs et al. | |
| 6,402,451 B1 * | 6/2002 | Brown ...................... | B60P 1/28 414/583 |
| 6,431,346 B1 | 8/2002 | Gilmore et al. | |
| 6,579,053 B1 | 6/2003 | Grams et al. | |
| 6,721,444 B1 | 4/2004 | Gu et al. | |
| 7,313,464 B1 | 12/2007 | Perreault et al. | |
| 7,474,939 B2 | 1/2009 | Oda et al. | |
| 7,516,848 B1 | 4/2009 | Shakes et al. | |
| 7,861,844 B2 | 1/2011 | Hayduchok et al. | |
| 8,662,314 B2 | 3/2014 | Jones et al. | |
| 8,718,814 B1 | 5/2014 | Clark et al. | |
| 8,874,270 B2 | 10/2014 | Ando | |
| 8,952,284 B1 | 2/2015 | Wong et al. | |
| 8,972,045 B1 | 3/2015 | Mountz et al. | |
| 9,061,868 B1 | 6/2015 | Paulsen et al. | |
| 9,120,622 B1 | 9/2015 | Elazary et al. | |
| 9,227,323 B1 | 1/2016 | Konolige et al. | |
| 9,259,844 B2 | 2/2016 | Xu et al. | |
| 9,283,680 B2 | 3/2016 | Yasuda et al. | |
| 9,415,949 B2 | 8/2016 | Buse | |
| 9,457,970 B1 | 10/2016 | Zevenbergen et al. | |
| 9,486,926 B2 | 11/2016 | Kawano | |
| 9,492,923 B2 | 11/2016 | Wellman et al. | |
| 9,520,012 B2 | 12/2016 | Stiernagle | |
| 9,604,363 B2 | 3/2017 | Ban | |
| 9,744,669 B2 | 8/2017 | Wicks et al. | |
| 10,206,519 B1 | 2/2019 | Gyori et al. | |
| 11,034,529 B2 | 6/2021 | Wagner et al. | |
| 11,267,662 B2 * | 3/2022 | Geyer ................. | B65G 47/1421 |
| 2002/0134056 A1 | 9/2002 | Dimario et al. | |
| 2002/0179502 A1 | 12/2002 | Cerutti et al. | |
| 2003/0042112 A1 | 3/2003 | Woerner et al. | |
| 2004/0112719 A1 | 6/2004 | Gilmore et al. | |
| 2004/0144618 A1 | 7/2004 | McDonald et al. | |
| 2005/0002772 A1 | 1/2005 | Stone | |
| 2006/0153667 A1 | 7/2006 | Pruteanu et al. | |
| 2006/0242785 A1 | 11/2006 | Cawley et al. | |
| 2008/0181753 A1 | 7/2008 | Bastian et al. | |
| 2010/0125361 A1 | 5/2010 | Mougin et al. | |
| 2010/0180711 A1 | 7/2010 | Kilibarda et al. | |
| 2010/0217528 A1 | 8/2010 | Sato et al. | |
| 2010/0241260 A1 | 9/2010 | Kilibarda et al. | |
| 2011/0144798 A1 | 6/2011 | Freudelsperger | |
| 2012/0118699 A1 | 5/2012 | Buchmann et al. | |
| 2013/0343640 A1 | 12/2013 | Buehler et al. | |
| 2014/0005831 A1 | 1/2014 | Naderer et al. | |
| 2014/0067121 A1 | 3/2014 | Brooks et al. | |
| 2014/0067127 A1 | 3/2014 | Gotou | |
| 2014/0244026 A1 | 8/2014 | Neiser | |
| 2014/0277693 A1 | 9/2014 | Naylor | |
| 2014/0291112 A1 | 10/2014 | Lyon et al. | |
| 2014/0341694 A1 | 11/2014 | Girtman et al. | |
| 2014/0341695 A1 | 11/2014 | Girtman et al. | |
| 2014/0360924 A1 | 12/2014 | Smith et al. | |
| 2014/0364998 A1 | 12/2014 | Neiser et al. | |
| 2015/0037123 A1 * | 2/2015 | Hobbs .................... | B65G 67/32 414/583 |
| 2015/0037131 A1 | 2/2015 | Girtman et al. | |
| 2015/0057793 A1 | 2/2015 | Kawano | |
| 2015/0063972 A1 | 3/2015 | Girtman et al. | |
| 2015/0063973 A1 | 3/2015 | Girtman et al. | |
| 2015/0073589 A1 | 3/2015 | Kohdl et al. | |
| 2015/0098775 A1 | 4/2015 | Razumov | |
| 2015/0224650 A1 | 8/2015 | Xu et al. | |
| 2015/0274447 A1 | 10/2015 | McCollum et al. | |
| 2015/0306634 A1 | 10/2015 | Maeda et al. | |
| 2015/0308466 A1 | 10/2015 | Girtman et al. | |
| 2015/0352721 A1 | 12/2015 | Wicks et al. | |
| 2015/0360882 A1 | 12/2015 | Girtman | |
| 2015/0369618 A1 | 12/2015 | Barnard et al. | |
| 2015/0375398 A1 | 12/2015 | Penn et al. | |
| 2015/0375880 A1 | 12/2015 | Ford et al. | |
| 2016/0027093 A1 | 1/2016 | Crebier | |
| 2016/0075521 A1 | 3/2016 | Puchwein et al. | |
| 2016/0096694 A1 | 4/2016 | Baylor et al. | |
| 2016/0136816 A1 | 5/2016 | Pistorino | |
| 2016/0199884 A1 | 7/2016 | Lykkegaard et al. | |
| 2016/0221187 A1 | 8/2016 | Bradski et al. | |
| 2016/0221762 A1 | 8/2016 | Schroader | |
| 2016/0221766 A1 | 8/2016 | Schroader et al. | |
| 2016/0243704 A1 | 8/2016 | Vakanski et al. | |
| 2016/0244262 A1 | 8/2016 | O'Brien et al. | |
| 2016/0264366 A1 | 9/2016 | Heitplatz | |
| 2016/0280477 A1 | 9/2016 | Pippin | |
| 2017/0021499 A1 | 1/2017 | Wellman et al. | |
| 2017/0043953 A1 | 2/2017 | Battles et al. | |
| 2017/0050315 A1 | 2/2017 | Henry et al. | |
| 2017/0057091 A1 | 3/2017 | Wagner et al. | |
| 2017/0066597 A1 | 3/2017 | Hiroi | |
| 2017/0073175 A1 | 3/2017 | Wicks et al. | |
| 2017/0080566 A1 | 3/2017 | Stubbs et al. | |
| 2017/0106532 A1 | 4/2017 | Wellman et al. | |
| 2017/0121134 A1 | 5/2017 | Girtman et al. | |
| 2017/0157648 A1 | 6/2017 | Wagner et al. | |
| 2017/0305694 A1 | 10/2017 | McMurrough et al. | |
| 2017/0312789 A1 | 11/2017 | Schroader | |
| 2017/0349385 A1 | 12/2017 | Moroni et al. | |
| 2018/0072517 A1 | 3/2018 | Girtman et al. | |
| 2018/0111765 A1 | 4/2018 | Wicks et al. | |
| 2018/0111769 A1 | 4/2018 | Yuvaraj et al. | |
| 2018/0134501 A1 | 5/2018 | Ge et al. | |
| 2018/0194574 A1 | 7/2018 | Wagner et al. | |
| 2018/0297786 A1 | 10/2018 | Clucas et al. | |
| 2018/0346264 A9 | 12/2018 | Girtman et al. | |
| 2018/0362270 A1 * | 12/2018 | Clucas ................ | G05B 19/4182 |
| 2019/0084769 A1 | 3/2019 | Clucas et al. | |
| 2020/0039747 A1 | 2/2020 | Ahmann et al. | |
| 2020/0148488 A1 | 5/2020 | Stenson | |
| 2020/0223066 A1 | 7/2020 | Diankov et al. | |
| 2020/0234071 A1 | 7/2020 | Yuvaraj et al. | |
| 2020/0270076 A1 | 8/2020 | Geyer et al. | |
| 2020/0276713 A1 | 9/2020 | Zhang et al. | |
| 2021/0171295 A1 | 6/2021 | Azuma et al. | |
| 2021/0198090 A1 | 7/2021 | Bando et al. | |
| 2021/0237986 A1 * | 8/2021 | Wagner .................... | B65G 67/02 |
| 2021/0363770 A1 | 11/2021 | Lindbo et al. | |
| 2022/0041383 A1 * | 2/2022 | Krishnamoorthy .... | B65G 11/14 |
| 2022/0080584 A1 | 3/2022 | Wicks et al. | |
| 2022/0097243 A1 | 3/2022 | Makhal et al. | |
| 2022/0144561 A1 * | 5/2022 | Geyer ................. | B65G 47/42 |
| 2022/0185602 A1 * | 6/2022 | Stenson ................ | B65G 67/46 |

(56) References Cited

U.S. PATENT DOCUMENTS

| | | | |
|---|---|---|---|
| 2023/0105141 A1* | 4/2023 | Allen | B25J 9/1682 |
| | | | 414/395 |
| 2023/0150137 A1 | 5/2023 | Sun et al. | |
| 2023/0158676 A1 | 5/2023 | Sun et al. | |

FOREIGN PATENT DOCUMENTS

| | | | |
|---|---|---|---|
| CN | 104743367 A | 7/2015 | |
| CN | 105905019 A | 8/2016 | |
| CN | 205500186 U | 8/2016 | |
| CN | 106167180 A | 11/2016 | |
| CN | 106629098 A | 5/2017 | |
| CN | 209684850 U | 11/2019 | |
| DE | 19510392 A1 | 9/1996 | |
| DE | 102004001181 A1 | 8/2005 | |
| DE | 102007023909 A1 | 11/2008 | |
| DE | 102007024670 A1 | 12/2008 | |
| DE | 102010033115 A1 | 2/2012 | |
| DE | 102011083095 A1 | 3/2013 | |
| DE | 102014111396 A1 | 2/2016 | |
| EP | 0235488 A1 | 9/1987 | |
| EP | 0613841 A1 | 9/1994 | |
| EP | 0767113 A2 | 4/1997 | |
| EP | 1223129 A1 | 7/2002 | |
| EP | 1695927 A2 | 8/2006 | |
| EP | 1995192 A2 | 11/2008 | |
| EP | 2055654 A1 | 5/2009 | |
| EP | 2152617 B1 * | 10/2011 | B65G 65/23 |
| EP | 2500150 A2 | 9/2012 | |
| EP | 2650237 A1 | 10/2013 | |
| EP | 2745982 A2 | 6/2014 | |
| EP | 2937299 A1 | 10/2015 | |
| EP | 3006379 A2 | 4/2016 | |
| EP | 3112295 A1 | 1/2017 | |
| EP | 3623324 A1 | 3/2020 | |
| FR | 1457450 A | 1/1966 | |
| FR | 2832654 A1 | 5/2003 | |
| GB | 2084531 A | 4/1982 | |
| GB | 2507707 A | 5/2014 | |
| JP | S54131278 A | 10/1979 | |
| JP | S63310406 A | 12/1982 | |
| JP | H0395001 A | 4/1991 | |
| JP | H08157016 A | 6/1996 | |
| JP | H05324662 B2 | 10/2001 | |
| JP | 2002028577 A | 1/2002 | |
| JP | 2003150230 A | 5/2003 | |
| JP | 2007182286 A | 7/2007 | |
| JP | 2008080300 A | 4/2008 | |
| JP | 2010202291 A | 9/2010 | |
| JP | 2014141313 A | 8/2014 | |
| KR | 20160057668 A | 5/2016 | |
| KR | 101710104 B1 | 3/2017 | |
| WO | 03095339 A1 | 11/2003 | |
| WO | 2007009136 A1 | 1/2007 | |
| WO | 2008145223 A1 | 12/2008 | |
| WO | 2010017872 A1 | 2/2010 | |
| WO | 2010034044 A1 | 4/2010 | |
| WO | 2011038442 A2 | 4/2011 | |
| WO | 2011128384 A1 | 10/2011 | |
| WO | 2012024714 A2 | 3/2012 | |
| WO | 2012127102 A9 | 9/2012 | |
| WO | 2014064592 A2 | 5/2014 | |
| WO | 2014111483 A1 | 7/2014 | |
| WO | 2015035300 A1 | 3/2015 | |
| WO | 2015118171 A1 | 8/2015 | |
| WO | 2015162390 A1 | 10/2015 | |
| WO | 2016198565 A1 | 12/2016 | |

OTHER PUBLICATIONS

Notification of Transmittal of the International Search Report and the Written Opinion of the International Searching Authority and the International Search Report and Written Opinion issued by the International Searching Authority (the European Patent Office) in related international application No. PCT/US2022/045671 dated Mar. 21, 2023, 24 pages.

Notification of Transmittal of the International Search Report and the Written Opinion of the International Searching Authority and the International Search Report and Written Opinion issued by the International Searching Authority (the European Patent Office) in related international application No. PCT/US2022/045943 dated Mar. 21, 2023, 23 pages.

Examiner's Report issued by Innovation, Science and Economic Development Canada (Canadian Intellectual Property Office) in related Canadian Patent Application No. 3,139,261 dated May 18, 2023, 4 pages.

Annex to Form PCT/ISA/206 (Partial Search) issued by the International Searching Authority (the European Patent Office) in related international application No. PCT/US2022/045671 on Jan. 30, 2023, xx pages.

Annex to Form PCT/ISA/206 (Partial Search) issued by the International Searching Authority (the European Patent Office) in related international application No. PCT/US2022/045943 on Jan. 30, 2023, xx pages.

Cipolla et al., "Visually Guided Grasping in Unstructured Environments," Journal of Robotics and Autonomous Systems, vol. 19, No. 3-4, Mar. 1, 1997, pp. 337-346.

Communication pursuant to Article 94(3) EPC issued by the European Patent Office in related European Patent Application No. 17826628.4 dated Aug. 31, 2022, 7 pages.

Communication pursuant to Rules 161(1) and 162 EPC issued by the European Patent Office dated Jul. 16, 2019 in related European Patent Application No. 17826628.4, 3 pages.

Decision on Rejection issued by the China National Intellectual Property Administration, P.R.C in related Chinese Patent Application No. 201780075644.9 dated Jun. 23, 2021, 23 pages.

Examiner's Report issued by the Innovation, Sciences and Economic Development Canada in related Canadian Patent Application No. 3,046,214 on May 25, 2020, 4 pages.

Examiner's Report issued by the Innovation, Sciences and Economic Development Canada in related Canadian Patent Application No. 3,046,214 dated Jan. 12, 2021, 4 pages.

Final Office Action issued by the U.S. Patent and Trademark Office in related U.S. Appl. No. 15/835,764 dated Jun. 11, 2019, 13 pages.

First Office Action, along with its English translation, issued by the National Intellectual Property Administration, P.R.C in related Chinese Patent Application No. 201780075644.9 dated May 20, 2020, 11 pages.

International Preliminary Report on Patentability issued by the International Searching Authority, the European Patent Office, in related International Patent Application PCT/US2017/065264 dated Jun. 11, 2019, 9 pgs.

International Search Report and Written Opinion issued by the International Searching Authority, the European Patent Office, in related International Patent Application PCT/US2017/065264 dated Mar. 19, 2018, 12 pgs.

Klingbeil et al., "Grasping with Application to an Autonomous Checkout Robot," Journal of Robotics and Automation (ICRA), 2011 IEEE, May 9, 2011, pp. 2837-2844.

Non-Final Office Action issued by the U.S. Patent and Trademark Office in related U.S. Appl. No. 15/835,764 dated Sep. 16, 2019, 8 pages.

Non-Final Office Action issued by the United States Patent and Trademark Office in related U.S. Appl. No. 16/776,197 dated Sep. 29, 2020, 13 pages.

Non-Final Office Action issued in related U.S. Appl. No. 15/835,764 dated Nov. 20, 2018, 10 pages.

Notification of Transmittal of the International Search Report and the Written Opinion of the International Searching Authority and the International Search Report and Written Opinion issued by the International Searching Authority (the European Patent Office) in related international application No. PCT/US2022/044927 dated Jan. 27, 2023, 15 pages.

Notification of Transmittal of the International Search Report and the Written Opinion of the International Searching Authority and the

(56) References Cited

OTHER PUBLICATIONS

International Search Report and Written Opinion issued by the International Searching Authority (the European Patent Office) in related international application No. PCT/US2022/045947 dated Feb. 1, 2023, 17 pages.

Second Office Action, along with its English translation, issued by the National Intellectual Property Administration, P.R.C in related Chinese Patent Application No. 201780075644.9 dated Jan. 6, 2021, 26 pages.

* cited by examiner

DYNAMIC PROCESSING OF OBJECTS PROVIDED IN ELEVATED VEHICLES WITH EVACUATION SYSTEMS AND METHODS FOR RECEIVING OBJECTS

PRIORITY

The present application claims priority to U.S. Provisional Patent Application No. 63/252,812, filed Oct. 6, 2021, the disclosure of which is hereby incorporated by reference in its entirety.

BACKGROUND

The invention generally relates to automated, robotic and other object processing systems such as sortation systems and relates in particular to automated and robotic systems intended for use in environments requiring, for example, that a variety of objects (e.g., parcels, packages, and articles, etc.) be processed and distributed to several output destinations.

Many parcel distribution systems receive parcels from a vehicle, such as a trailer of a tractor trailer. The parcels are unloaded and delivered to a processing station in a disorganized stream that may be provided as individual parcels or parcels aggregated in groups such as in bags, and may be provided to any of several different conveyances, such as a conveyor, a pallet, a Gaylord, or a bin. Each parcel must then be distributed to the correct destination container, as determined by identification information associated with the parcel, which is commonly determined by a label printed on the parcel or on a sticker applied to the parcel. The destination container may take many forms, such as a bag or a bin.

The sortation of such parcels from the vehicle has traditionally been done, at least in part, by human workers that unload the vehicle, then scan the parcels, e.g., with a hand-held barcode scanner, and then place the parcels at assigned locations. For example, many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these objects has traditionally been done by hand. A human sorter picks an object from an incoming bin, finds a barcode on the object, scans the barcode with a handheld barcode scanner, determines from the scanned barcode the appropriate bin or shelf location for the object, and then places the object in the so-determined bin or shelf location where all objects for that order have been defined to belong. Automated systems for order fulfillment have also been proposed, but such systems still require that objects be first removed from a vehicle for processing if they arrive by vehicle.

Such systems do not therefore, adequately account for the overall process in which objects are first delivered to and provided at a processing station by a vehicle such as a trailer of a tractor trailer. Additionally, many processing stations, such as sorting stations for sorting parcels, are at times, at or near full capacity in terms of available floor space and sortation resources, and there is further a need therefore for systems to unload vehicles and efficiently and effectively provide an ordered stream of objects from the trailer of the tractor trailer.

SUMMARY

In accordance with an aspect, the invention provides a system for receiving a plurality of objects from an elevated trailer of a tractor trailer. The system includes a collection conveyor extending between a base end and a coupled end, the coupled end being rotatably coupled to an evacuation conveyor, said collection conveyor including an object facing surface between the base end and the coupled end for receiving the plurality of objects, said collection conveyor being rotatably adjustable with respect to the evacuation conveyor at the coupled end, and both the evacuation conveyor and the coupled end of the collection conveyor being elevationally adjustable.

In accordance with another aspect, the system includes a collection conveyor extending between a base end and a coupled end, the collection conveyor being adapted to retain the plurality of objects within the tractor trailer when the collection conveyor is in a first position with respect to the tractor trailer, and to permit the plurality of objects to travel up the collection conveyor when the collection conveyor is in a second position with respect to the tractor trailer.

In accordance with a further aspect, the invention provides a method of receiving a plurality of objects from an elevated trailer of a tractor trailer. The method includes urging a collection conveyor against the plurality of objects in the trailer from a rear of the trailer, providing the elevated trailer such that the rear of the trailer is lower than a front of the trailer, retaining the plurality of objects within the trailer with the collection conveyor, lowering an upper portion of the collection conveyor, and permitting the plurality of objects to move upward along the collection conveyor to an evacuation conveyor.

In accordance with yet a further aspect, the invention provides a system for emptying contents of a trailer of a tractor trailer. The system includes an elevation system for elevating a front end of the trailer with respect to a rear end of the trailer, a collection conveyor for receiving objects from the elevated trailer and for controlling a rate of removal of objects from the elevated trailer, and an evacuation conveyor pivotally coupled to the collection conveyor for receiving the objects from the collection conveyor.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
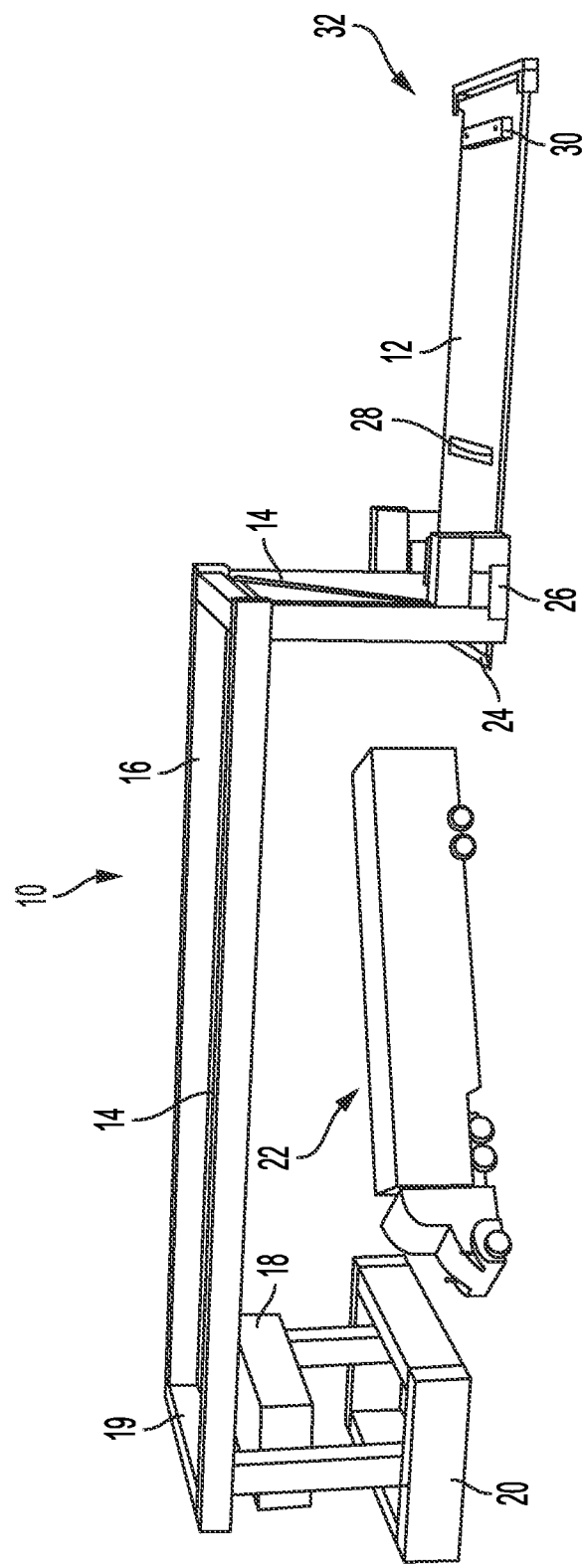
FIG. 1 shows an illustrative diagrammatic view of a system for elevating a trailer of a tractor trailer in accordance with an aspect of the present invention.

In accordance with various aspects, the invention provides a processing system in which a plurality of objects are received from an elevated trailer of a tractor trailer. With reference to FIG. 1, the system includes a vehicle elevation system 10 that includes a vehicle lift plate 12 attached at a first end via cables 14 over a frame 16 to a large counterweight 18. The cables 14 travel through a movement control system 19 that may control (e.g., stop, slow or actively power) movement of the cables 14. In cooperation with the counterweight 18, the control system 19 controls the lifting and lowering of the trailer. In accordance with various embodiments, the system may be designed to lift either a trailer alone (decoupled from the tractor and using a smaller counterweight) or both the tractor and trailer as shown. A protective barrier 20 is provided around the area below the counterweight 18, and the frame 16 is sufficiently large to accommodate the movement and positioning of a tractor trailer vehicle 22 below the frame 16. A small vehicle ramp 24 and lift stop blocks 26 are provided at the first end of the vehicle lift plate 12. The lift stop blocks 26 remain engaged until the system is ready to lift the vehicle as discussed below. The vehicle lift plate 12 also includes a front wheel chock block receiving area 28 for receiving a front wheel chock block and includes a fixed rear wheel chock block 30. The vehicle lift plate 12 is attached at a second end that is opposite the first end to a lift plate pivot system 32.

Figure 2:
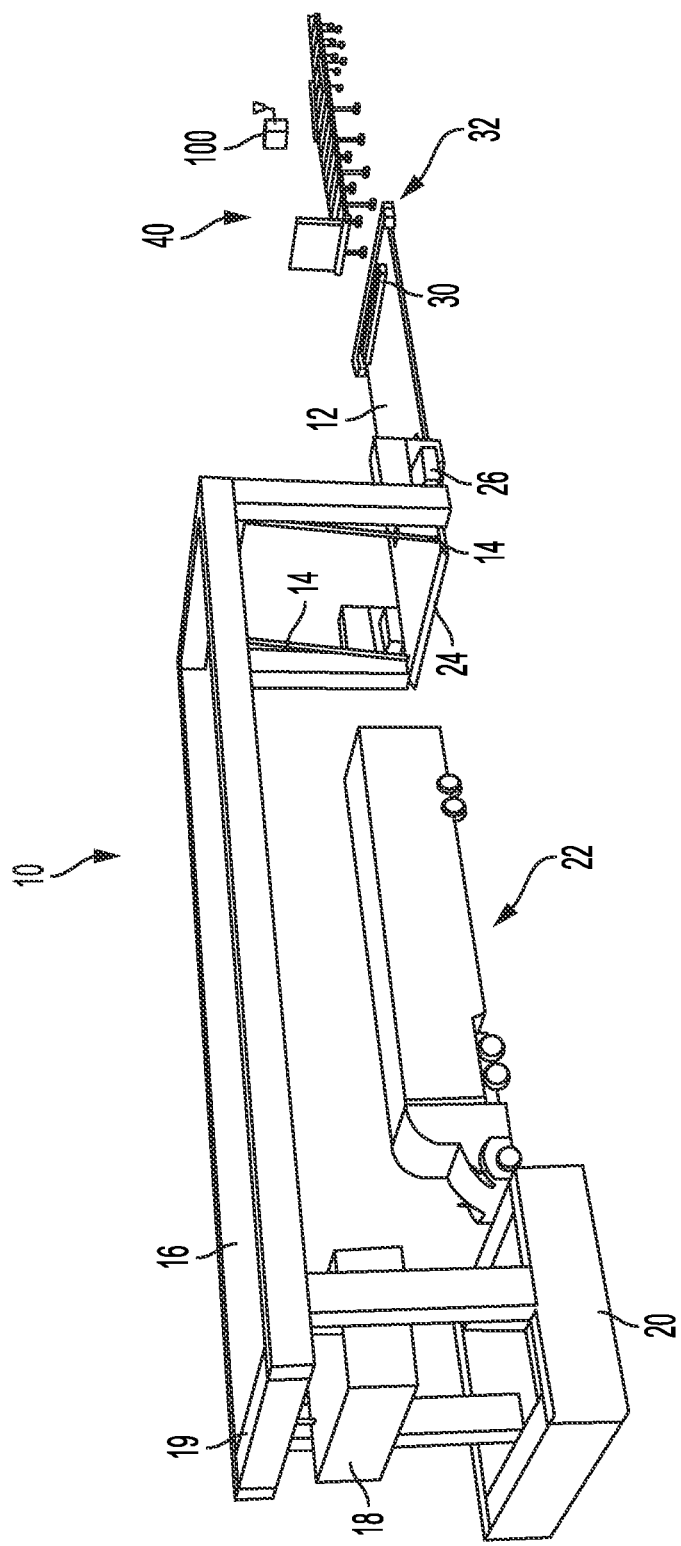
FIG. 2 shows an illustrative diagrammatic view of the system of FIG. 1 additionally showing an object collection system in accordance with a further aspect of the present invention.
Figure 3:
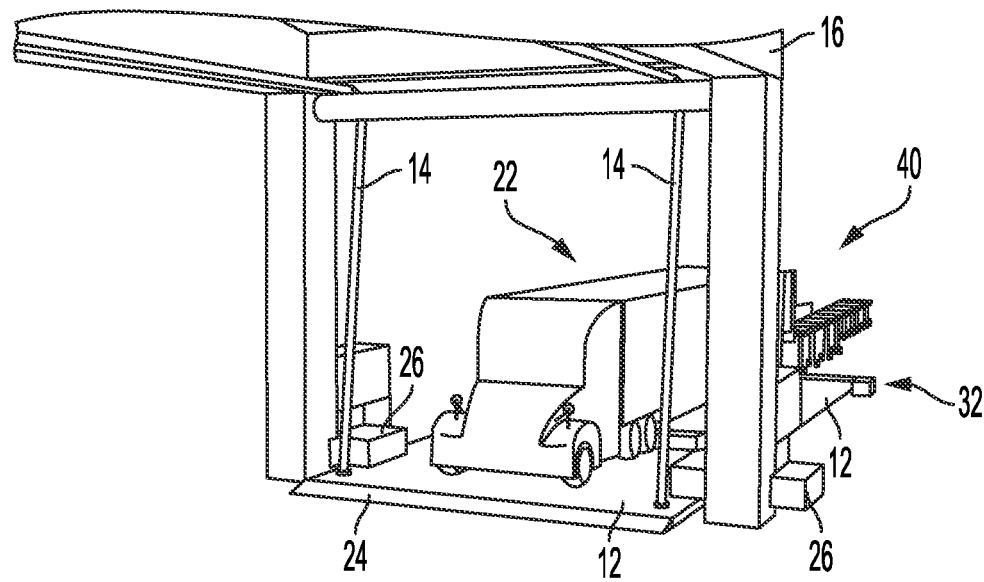
FIG. 3 shows an illustrative diagrammatic front view of a tractor trailer in an elevation station in accordance with an aspect of the present invention.
Figure 4:
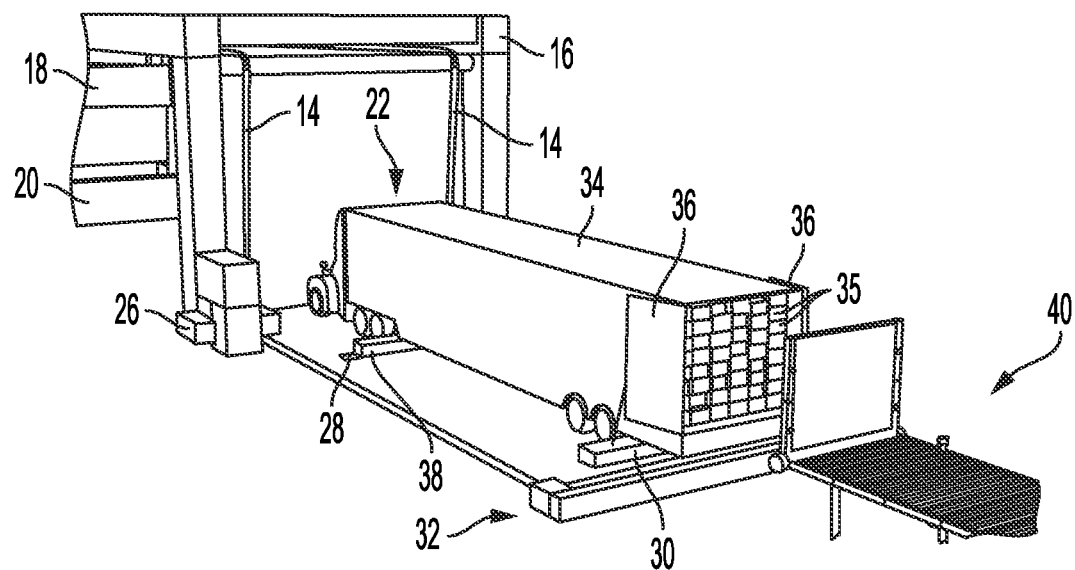
FIG. 4 shows an illustrative diagrammatic rear view of the tractor tailer of FIG. 3 showing a portion of the evacuation system in accordance with an aspect of the present invention.

With further reference to FIG. 2, the tractor trailer vehicle 22 is positioned to be pulled forward toward the protective barrier 20 such that it may be backed up through an opposite end of the frame 16 onto the vehicle lift plate 12. An evacuation system 40 is also provided for receiving a plurality of objects as discussed in more detail below, and the operation of the systems described herein may be controlled (e.g., wirelessly or by a wired network) by one or more computer processing systems 100. The tractor trailer vehicle 22 may be backed up over the ramp 24 onto the vehicle lift plate 12 as shown in FIG. 3. A front wheel chock block 38 is then placed in the block receiving area 28 behind the tractor as further shown in FIG. 4, and the rear doors 36 of the trailer 34 are fastened open, exposing the objects 35 within the trailer 34.

Figure 5:
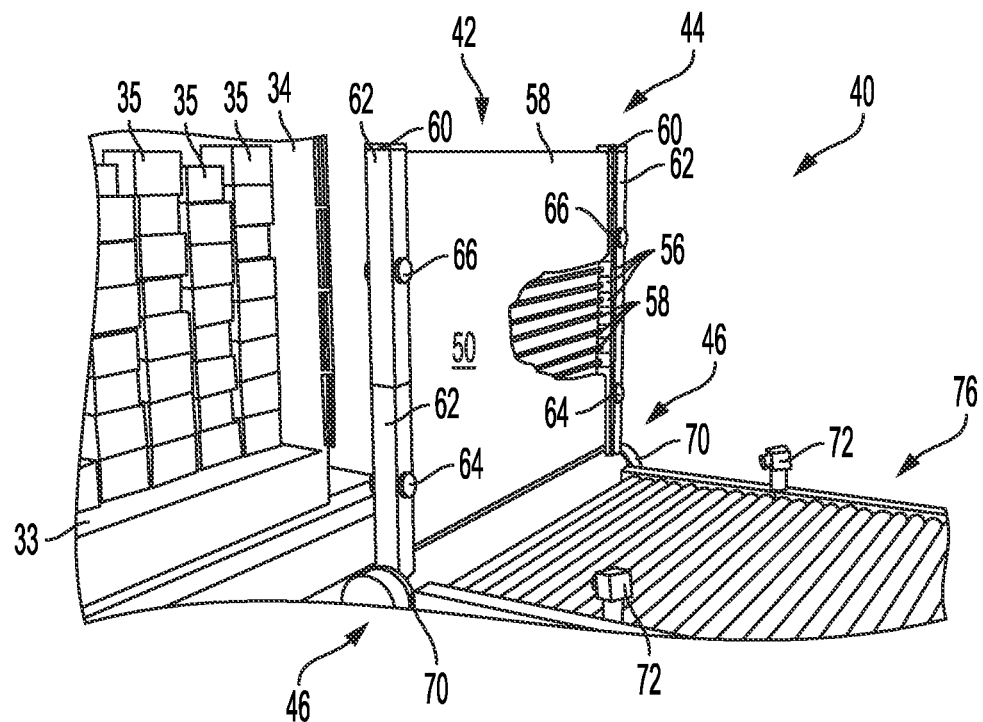
FIG. 5 shows an illustrative diagrammatic enlarged view of an engagement side of a collection conveyor of the evacuation system of FIG. 2.
Figure 6:
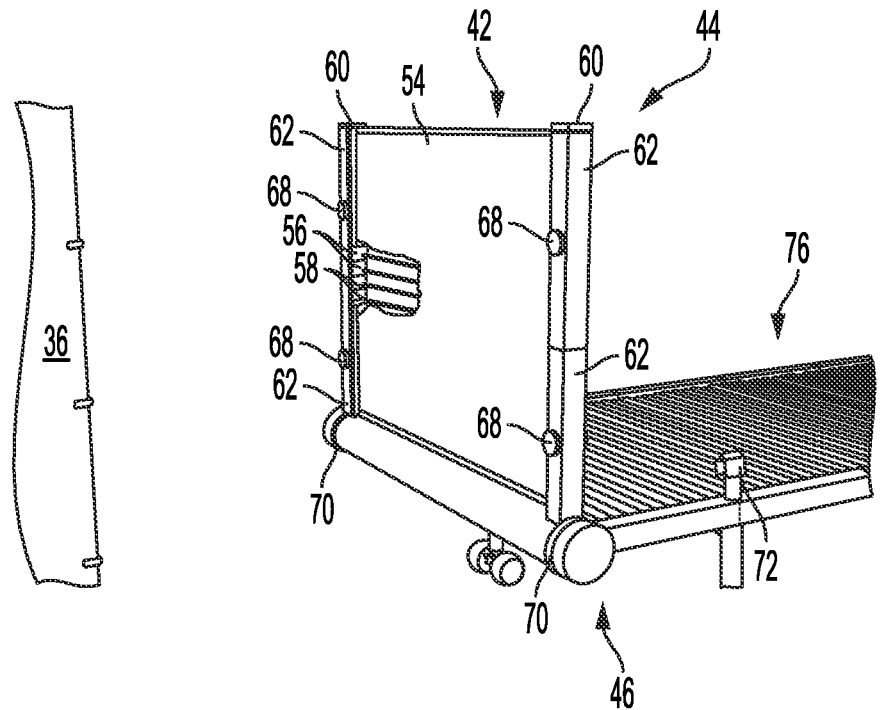
FIG. 6 shows an illustrative diagrammatic view of the back side of the collection conveyor of FIG. 5.

The system 40 includes a collection conveyor 42 with a base end 44 and a coupled end 46 that is rotationally coupled to an evacuation conveyor 76 as shown in FIGS. 5 and 6. The collection conveyor 42 of FIGS. 5 and 6 includes a conveyor belt 50 providing an object facing surface 52 and a backside surface 54. The collection conveyor 42 also includes force detection units 56 on either vertical side of the collection conveyor 42, with force transfer beams 58 extending between pairs of force detection units 56 inside the belt 50. The rollers (e.g., one or both of which are actively powered) at the ends (base end and coupled end) that provide the belt conveyor movement are also mounted on force detection units 56.

The collection conveyor 42 includes a pair of magnets 60 (e.g., permanent magnets or selectively controlled electromagnets) at the base end of the collection conveyor 42. The magnets 60 are provided on side beams 62 and the magnets 60 facilitate positioning of the collection conveyor within the trailer as discussed in more detail below. The side beams also include upper perception units 64 and lower perception units 66 on the object facing side of the collection conveyor 42, as well as assessment perception units 68 on the backside of the collection conveyor 42 that is opposite the collection side. The assessment perception units 68 facilitate assessment of a load of objects within a trailer prior to engagement and assist in guiding the system 40 toward the end of a trailer. The upper trailer engagement perception units 64 assist in monitoring locations and positions of objects in an upper area of the trailer, while the lower trailer engagement perception units 66 assist in monitoring locations and positions of objects in a lower area of the trailer. The force transfer beams 58 facilitate monitoring a load on the collection conveyor 42 (e.g., on the object facing side thereof) during engagement with a trailer. The belt 50 runs over the outer surfaces of the force transfer beams 58 and transfer a force thereon directed to the force detection units 56.

The collection conveyor 42 is pivotally mounted to the evacuation conveyor 76 at the coupled end 46 that includes a pivot coupling mounted on force torque sensors 70 for detecting any forces acting on the pivot coupling. The evacuation conveyor 76 (e.g., a roller conveyor as shown or a belt conveyor) includes one or more evacuation conveyor engagement perception units 72 for perceiving data regarding any visible regions within the trailer (depending on a position of the collection conveyor) as well as data regarding objects being moved onto the evacuation conveyor 46 from the collection conveyor 42.

The system therefore includes a collection conveyor extending between a base end and a coupled end, the coupled end being rotatably coupled to an evacuation conveyor in accordance with an aspect of the invention. The collection conveyor includes an object facing surface between the base end and the coupled end for receiving the plurality of objects. The collection conveyor is rotatably adjustable with respect to the evacuation conveyor at the coupled end, and both the evacuation conveyor and the coupled end of the collection conveyor are elevationally adjustable.

Figure 7:
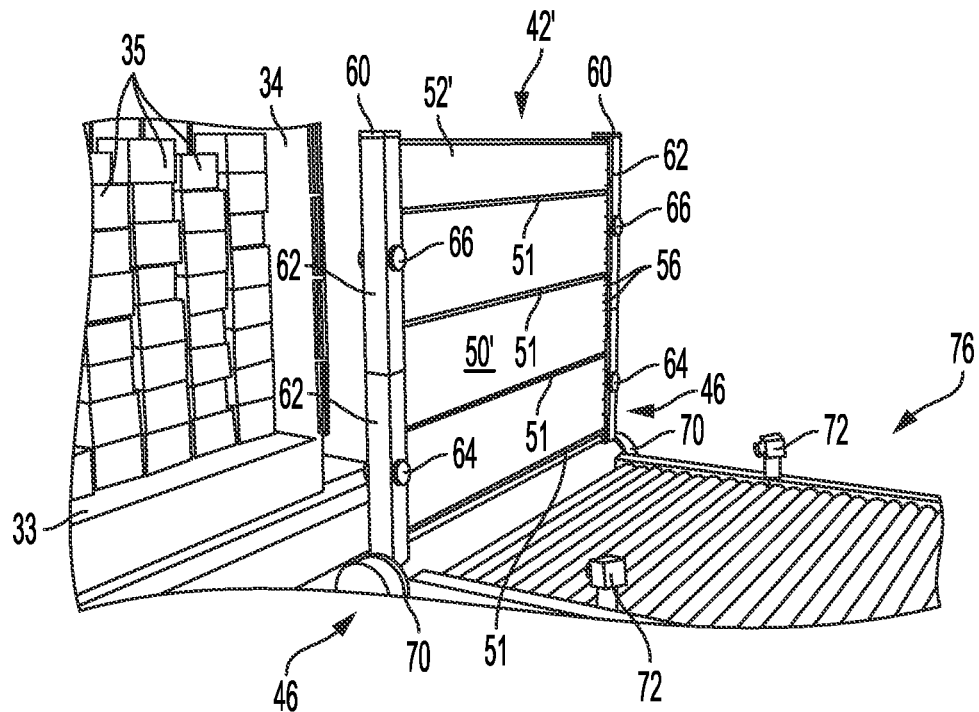
FIG. 7 shows an illustrative diagrammatic enlarged view of an engagement side of a collection conveyor that includes cleats in accordance with an aspect of the present invention.

With reference to FIG. 7, in accordance with another aspect of the present invention, the system 40 includes a collection conveyor 42' with a conveyor belt 50' that includes cleats 51 (a cleated conveyor). The collection conveyor 42' similarly includes base end 44 and a coupled end 46 that is rotationally coupled to an evacuation conveyor 76, as well as an object facing surface 52' and a backside surface. The collection conveyor 42' also similarly includes force detection units 56 on either vertical side of the collection conveyor 42', with force transfer beams 58 extending between pairs of force detection units 56 inside the cleated belt 50'. Again, the rollers (e.g., one or both of which are actively powered) at the ends (base end and coupled end) that provide the belt conveyor movement are also mounted on force detection units 56.

The collection conveyor 42' similarly includes a pair of magnets 60 (e.g., permanent magnets or selectively controlled electromagnets) at the base end of the collection conveyor 42'. The magnets 60 are provided on side beams 62 and facilitate positioning of the collection conveyor within the trailer. The side beams also include upper perception units 64 and lower perception units 66 on the object facing side of the collection conveyor 42', as well as assessment perception units 68 on the backside of the collection conveyor 42' that is opposite the collection side. The assessment perception units 68 facilitate assessment of a load of objects within a trailer prior to engagement and assist in guiding the system 40 toward the end of a trailer. The upper trailer engagement perception units 64 assist in monitoring locations and positions of objects in an upper area of the trailer, while the lower trailer engagement perception units 66 assist in monitoring locations and positions of objects in a lower area of the trailer. The force transfer beams 58 facilitate monitoring a load on the collection conveyor 42' (e.g., on the object facing side thereof) during engagement with objects within a trailer. The conveyor belt 50' runs over the outer surfaces of the force transfer beams 58 and transfer a force thereon directed to the force detection units 56.

Figure 8:
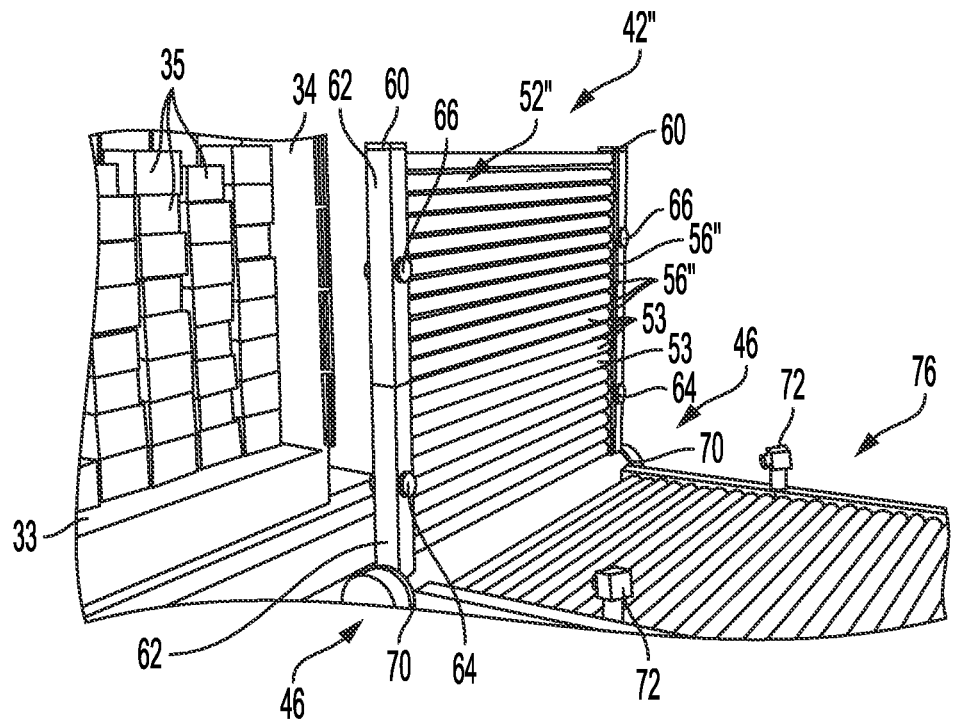
FIG. 8 shows an illustrative diagrammatic enlarged view of an engagement side of a collection conveyor that includes rollers in accordance with a further aspect of the present invention.

In accordance with another aspect of the present invention, the system 40 includes a collection conveyor 42" with a plurality of rollers 53 as shown in FIG. 8. The collection conveyor 42" similarly includes base end 44 and a coupled end 46 that is rotationally coupled to an evacuation conveyor 76, as well as an object facing surface 52" and a backside surface. The collection conveyor 42" also similarly includes force detection units 56" on either side of the rollers 53 (on which the rollers are mounted).

The collection conveyor 42" similarly includes a pair of magnets 60 (e.g., permanent magnets of selectively controlled electromagnets) at the base end of the collection conveyor 42". The magnets 60 are provided on side beams 62 to facilitate positioning within the trailer. The side beams also include upper perception units 64 and lower perception units 66 on the object facing side of the collection conveyor 42", as well as assessment perception units 68 on the backside of the collection conveyor 42" that is opposite the collection side. The assessment perception units 68, the upper trailer engagement perception units 64, and the lower trailer engagement perception units 66 function as discussed above.

Again, the collection conveyor 42', 42" is pivotally mounted to the evacuation conveyor 46 at the coupled end 46 that includes a pivot coupling mounted on force torque sensors 70 for detecting any forces acting on the pivot coupling. The evacuation conveyor 76 (e.g., a roller conveyor as shown or a belt conveyor) includes one or more evacuation conveyor engagement perception units 72 for perceiving data regarding any visible regions within the trailer (depending on a position of the collection conveyor) as well as data regarding objects being moved onto the evacuation conveyor 46 from the collection conveyor 42', 42". As discussed in more detail herein, the collection conveyors 42' and 42" may be used with any of the systems discussed herein with reference to collection conveyor 42.

Figure 9:
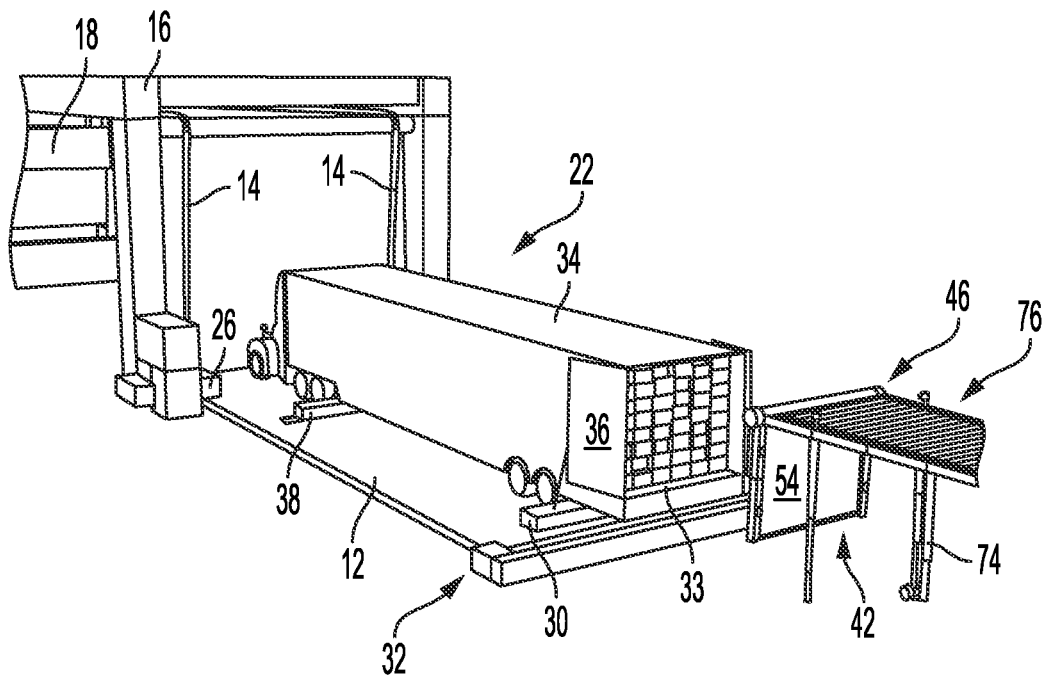
FIG. 9 shows an illustrative diagrammatic view of the evacuation system of FIG. 2 prior to engagement with the trailer of the tractor trailer.
Figure 10:
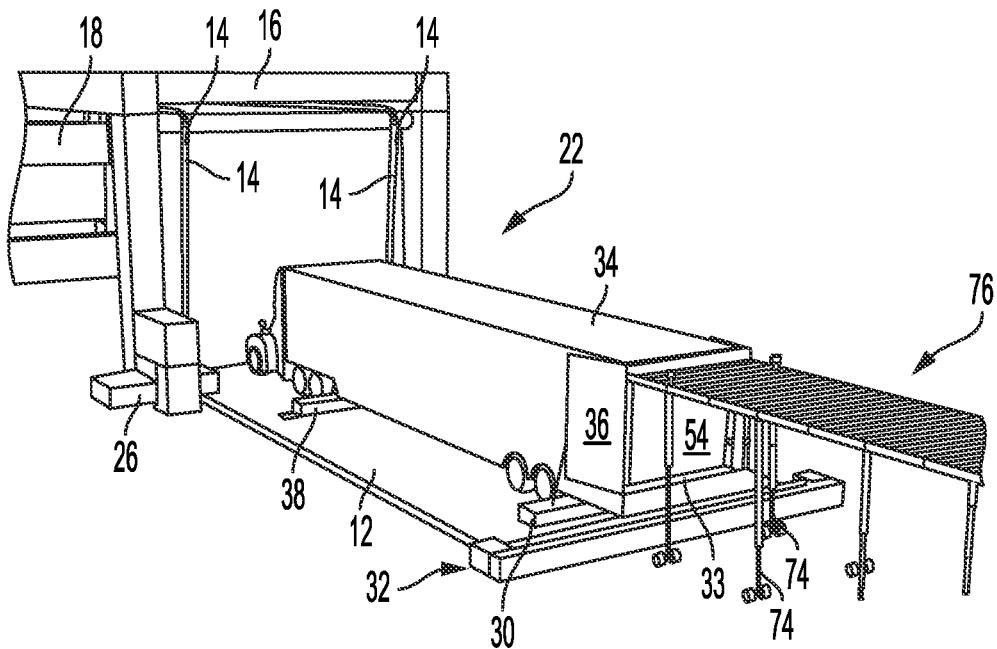
FIG. 10 shows an illustrative diagrammatic view of the evacuation system of FIG. 2 upon engagement with the trailer of the tractor trailer.

With reference to FIG. 9, the evacuation conveyor 76 is supported by extendable support legs 74 (mounted on wheels). The evacuation conveyor 46 is then elevated (on the extendable support legs 74) such that it is close to the elevation of the top of the trailer 34 of the tractor trailer vehicle 22. The collection conveyor 72 is then rotated about the coupled end 46 pivot mounting with respect to the evacuation conveyor 76 such that the object facing surface faces the objects 35 in the trailer 34, and the backside 54 faces away from the trailer 34. With further reference to FIG. 10, the system 40 is moved (on the support wheels) toward the trailer 34 of the tractor trailer vehicle 22 and engages the objects in the trailer on the object facing surface of the collection conveyor 42. The magnets 60 on the ends of the side beams 62 then engage the floor 33 of the inside of the trailer 34, preferably with the side beams 62 standing vertical on the floor, maximizing the contact surface between the magnets 60 and the floor 33. In the event that the trailer 34 is not full such that objects are directly engaged with the collection conveyor 42, the collection conveyor is still engaged with the floor of the interior of the trailer 34 near the end of the trailer (e.g., with the side beams 62 being perpendicular to the floor 33).

Figure 11:
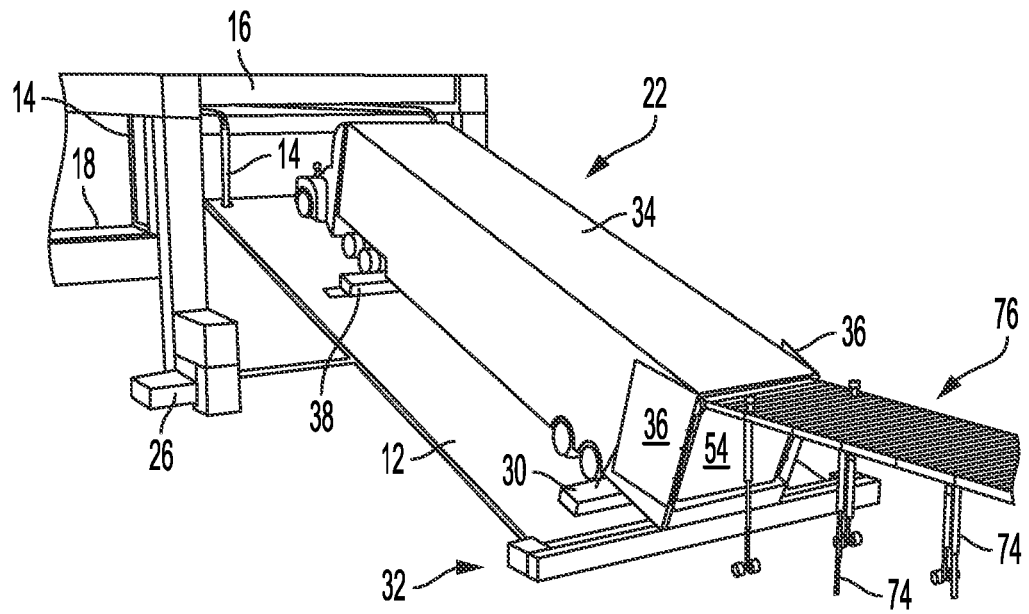
FIG. 11 shows an illustrative diagrammatic view of the evacuation system of FIG. 2 upon engagement with the trailer of the tractor trailer with the trailer elevated.
Figure 12:
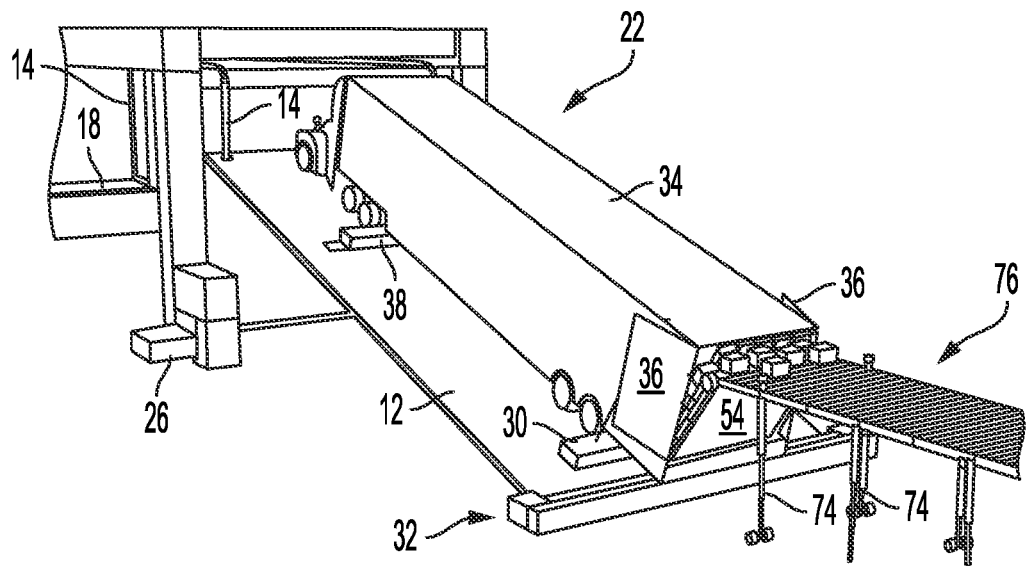
FIG. 12 shows an illustrative diagrammatic view of the evacuation system of FIG. 2 upon engagement with the trailer of the tractor trailer showing objects being evacuated from the elevated trailer.

Once the collection conveyor 42 is engaged within the trailer 42, the lift stop blocks 26 are disengaged from the vehicle lift plate 12 as shown in FIG. 10. The movement control system 19 (discussed above with reference to FIGS. 1 and 2) may then release a hold on movement of the cables, permitting the vehicle lift plate to be raised as shown in FIG. 11 with the tractor trailer vehicle 22 on the vehicle lift plate 12. The collection conveyor 42 adjusts as the tractor trailer vehicle 22 is being elevated (as discussed in more detail below), and the collection conveyor 42 holds the objects within the trailer 34 until the system is ready to unload the objects in a controlled fashion. To unload the objects, the system 40 moves the coupled end 46 of the collection conveyor (and the evacuation conveyor 76) a small distance away from the trailer 34 (as shown in FIG. 12), and eventually moves the coupled end 46 of the collection conveyor and the evacuation conveyor 76 lower toward the ground as objects are removed from the trailer.

Prior to lifting, the magnets 60 are engaged with the floor 33 of the inside of the trailer and the position of the evacuation conveyor 76 is adjusted to position the collection conveyor 42 to be approximately perpendicular to the floor 33 of the trailer 34. With the magnets seated against the floor of the trailer at the outset of the trailer lifting, the collection conveyor should have a reduced chance of sliding on the floor toward the end of the trailer. As the trailer is lifted, the base end of the collection conveyor may move away from the vertical position with respect to the trailer floor such that the collection conveyor 42 and the interior floor of the trailer should form an obtuse angle, facilitating maintaining the base of the collection conveyor within the trailer. Two points of rotation are therefore potentially at play.

Figure 13:
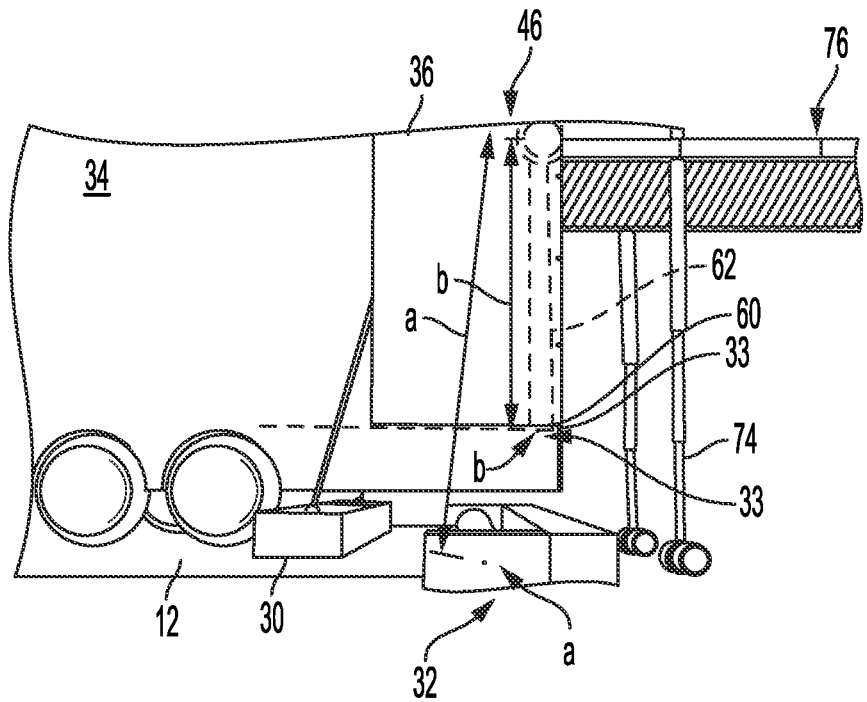
FIG. 13 shows an illustrative diagrammatic side view of the evacuation system of FIG. 4 upon engagement with the trailer of the tractor trailer.
Figure 14:
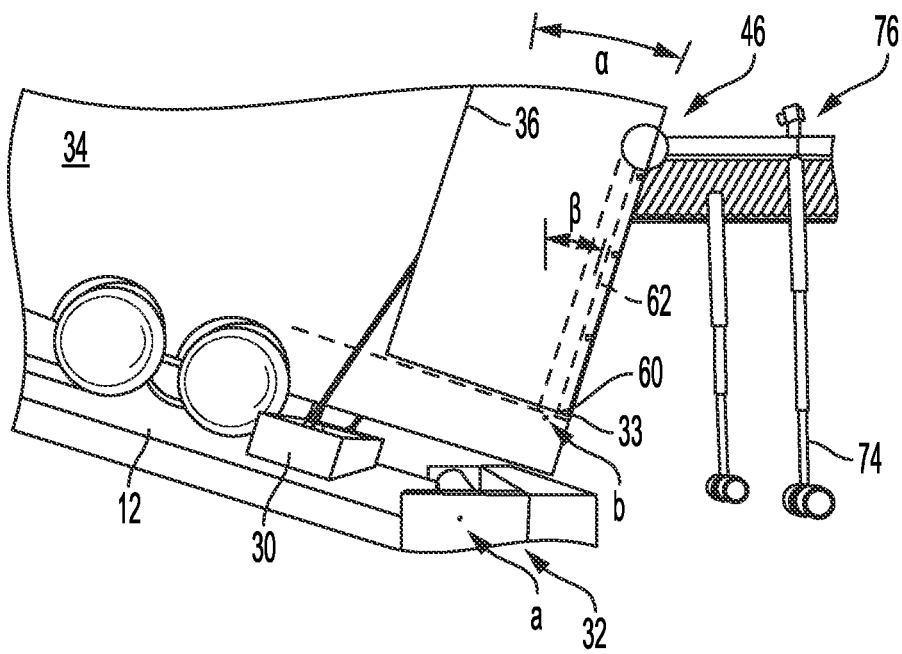
FIG. 14 shows an illustrative diagrammatic side view of the evacuation system of the evacuation system of FIG. 4 upon engagement with the trailer of the tractor trailer with the trailer elevated.

For example, FIG. 13 shows that the vehicle lift plate 12 (and the vehicle 22 including the trailer 34 thereon) will pivot about an axis (labelled a) within the lift plate pivot system 32. As the collection conveyor 42 pivots with respect to its base end 44 that includes the magnets 60, the collection conveyor 42 may pivot about an axis (labelled b) within the trailer 34. The coupled end 46 of the collection conveyor therefore may pivot about both axes a and b. The radius of the pivot with respect to axis a is shown at $r_a$ and the radius of the pivot with respect to axis b is shown at $r_b$ in FIG. 13. The potential angle of movement of the coupled end 46 with respect to axis a is shown as an angle $\alpha$ and the potential angle of movement of the coupled end 46 with respect to axis b is shown as an angle $\beta$ in FIG. 14. The resulting movement vector may be given by the chord equations $c_a = 4r \sin(\alpha/2)$ and $c_\beta = 4r \sin(\beta/2)$, each including vertical components and horizontal components. Knowing these general values, the system may accommodate the lifting of the vehicle by moving the elevated conveyor 76 in both vertical and horizontal directions as the vehicle is lifted to ensure that the collection conveyor 42 remains properly positioned within the trailer. The force sensors 56 and 70 are also monitored to ensure that the collection conveyor is not receiving too much force against it from the objects within the trailer, and the perception units 62, 64, 66 and 72 are monitored to confirm that the anticipated movement occurs.

In accordance with certain aspects therefore, the invention provides a system for receiving a plurality of objects from an elevated trailer of a tractor trailer, and the system includes a collection conveyor extending between a base end and a coupled end. The collection conveyor is adapted to retain the plurality of objects within the tractor trailer when the collection conveyor is in a first position with respect to the tractor trailer, and to permit the plurality of objects to travel up the collection conveyor when the collection conveyor is in a second position with respect to the tractor trailer.

Figure 15:
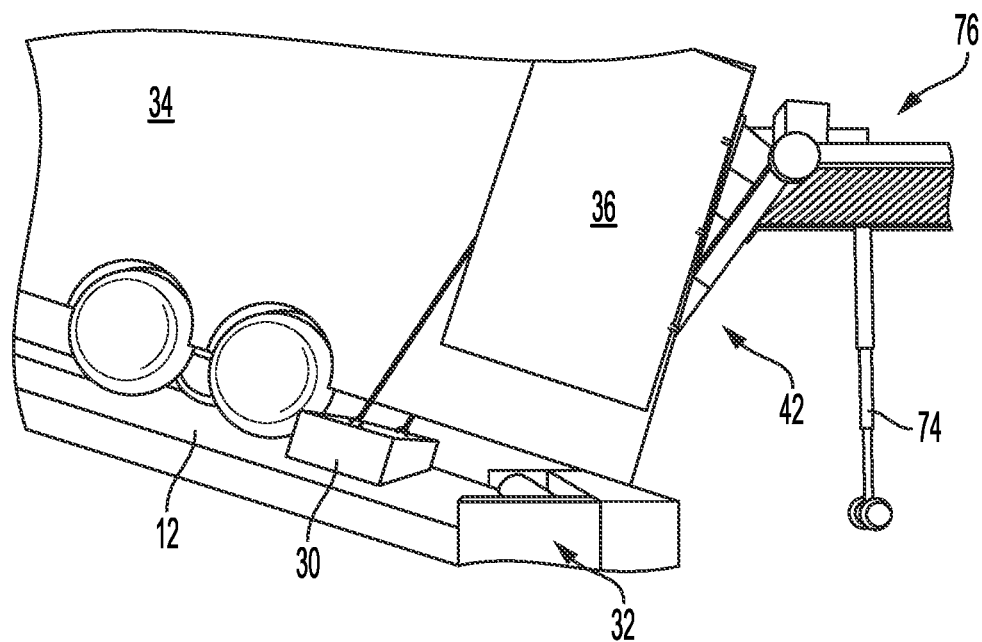
FIG. 15 shows an illustrative diagrammatic side view of the evacuation system of FIG. 4 upon engagement with the trailer of the tractor trailer showing objects being evacuated from the elevated trailer.
Figure 16:
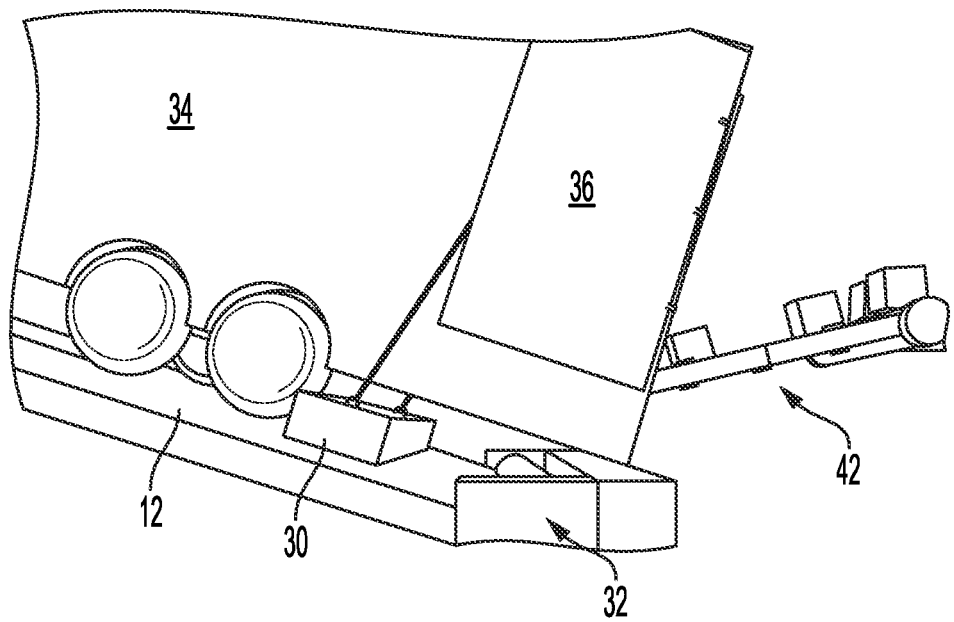
FIG. 16 shows an illustrative diagrammatic side view of the evacuation system of FIG. 4 upon engagement with the trailer of the tractor trailer showing objects being evacuated from the elevated trailer with the collection conveyor having been lowered as objects are removed from the trailer.
Figure 17:
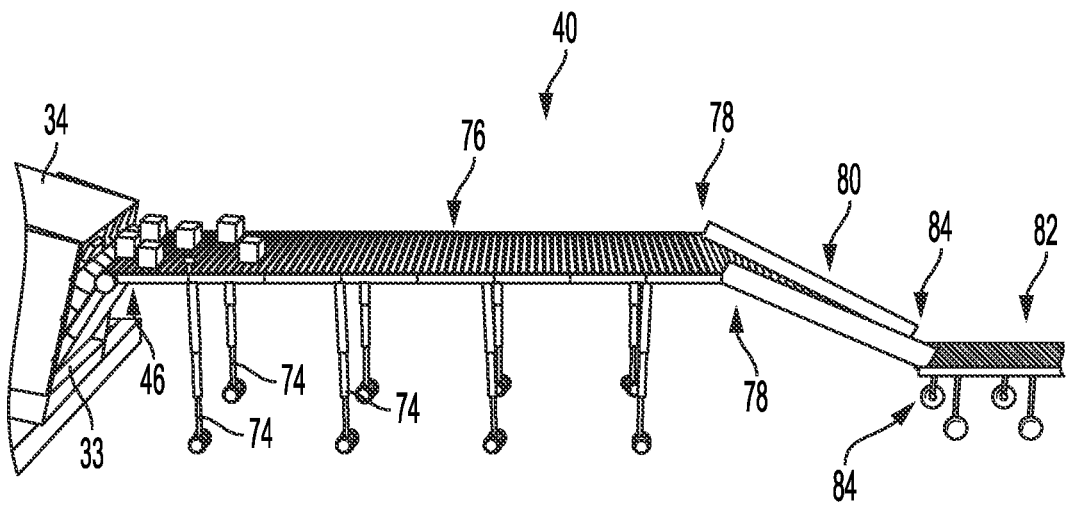
FIG. 17 shows an illustrative diagrammatic elevated side view of an evacuation conveyor of the evacuation system of FIG. 2.
Figure 18:
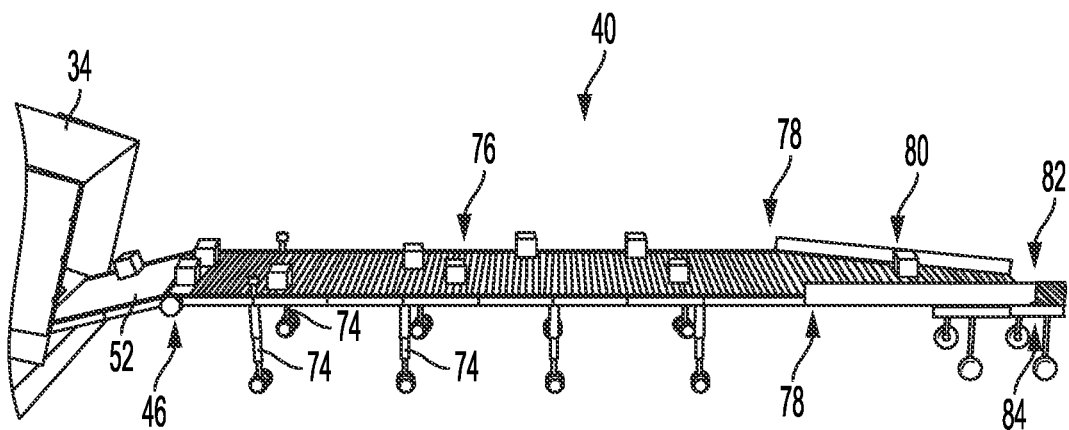
FIG. 18 shows an illustrative diagrammatic elevated side view of an evacuation conveyor of the evacuation system of FIG. 2 in an elevated position.

As the elevation of objects within the trailer is reduced, the coupled end 46 of the collection conveyor 42 is lowered to facilitate the removal of objects. FIG. 15 shows a side view of the collection conveyor 42 at an elevated position reviewing objects from a fully loaded trailer 34, while FIG. 16 shows the collection conveyor 42 at a lowered position reviewing objects from the trailer 34 when it is less loaded. The evacuation conveyor 76 includes the extendable support legs 74 as discussed above, as well as a ramp section 80 that is pivotally coupled to the evacuation conveyor 76 by a pivot coupling 78, as well as a dynamic engagement assembly 84 for dynamically engaging a facilities conveyor 82 as shown in FIG. 17. FIG. 17 shows the evacuation conveyor 76 at an elevated position facilitating removal of objects, and FIG. 18 shows the evacuation conveyor 76 (and the coupled end 46) at a lowered position while continuing to facilitate removal of objects from the trailer.

Figure 19:
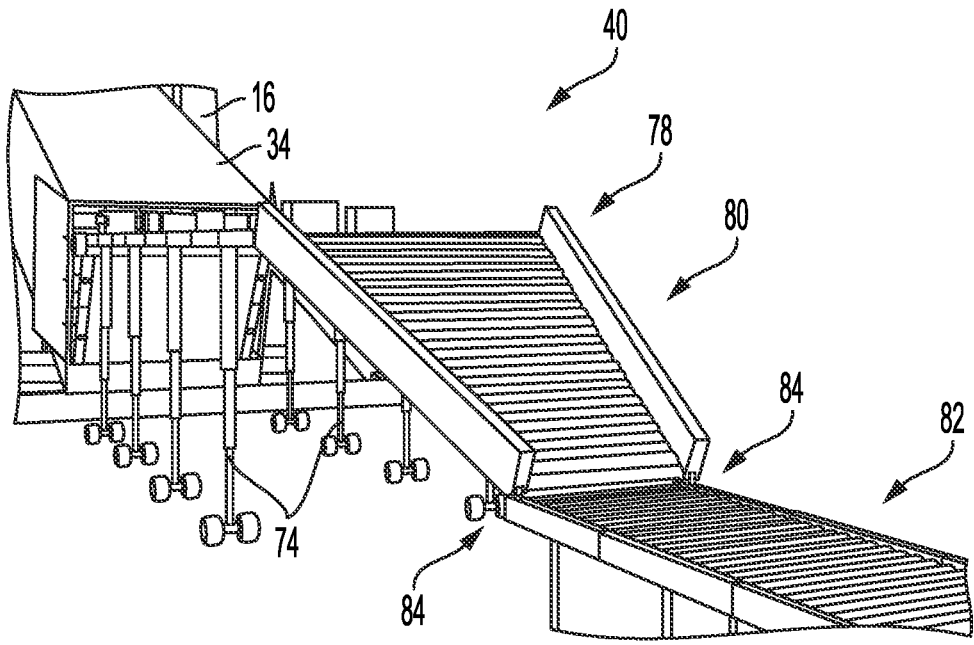
FIG. 19 shows an illustrative diagrammatic view of a ramp section of the evacuation system of FIG. 2 in an elevated position.
Figure 20:
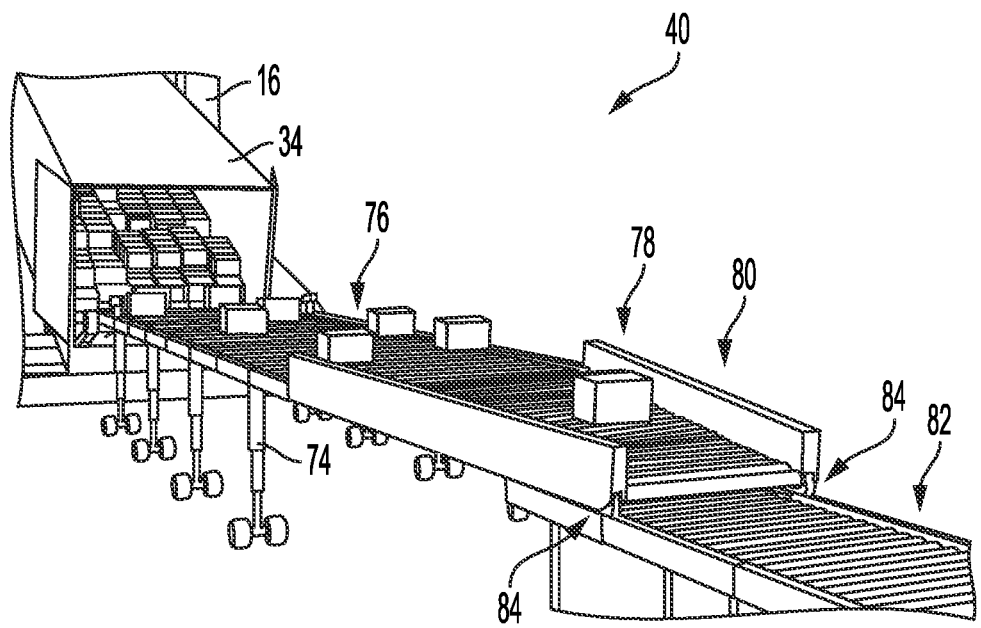
FIG. 20 shows an illustrative diagrammatic view of the ramp section of FIG. 19 in a lowered position.

With further reference to FIG. 19, the ramp section 80 that is pivotally coupled (passively) at 78 to the elevation conveyor 76. The evacuation system includes a ram section that has a tapered width, bringing the objects into a smaller width conveyance for the facilities conveyor 82. The ramp section 80 also includes a dynamic engagement system 82 that permits the lower end of the ramp section to travel along (e.g., by wheels in a track) the facilities conveyor 82. FIG. 19 shows the evacuation conveyor 76 elevated (with the upper end of the ramp section 80), and FIG. 20 shows the evacuation conveyor lowered, wherein the dynamic engagement system 82 provides that the ramp section travels along the facilities conveyor 82 to ensure that objects are deposited onto the facilities conveyor 82.

In accordance with further aspects therefore, the invention provides a method of receiving a plurality of objects from an elevated trailer of a tractor trailer. The method includes urging a collection conveyor against the plurality of objects in the trailer from a rear of the trailer, providing the elevated trailer such that the rear of the trailer is lower than a front of the trailer, retaining the plurality of objects within the trailer with the collection conveyor, lowering an upper portion of the collection conveyor, and permitting the plurality of objects to move upward along the collection conveyor to an evacuation conveyor, with further processing toward a facilities conveyor via a ramp section and dynamic engagement system.

The invention further provides in accordance with further aspects, a system for emptying contents of a trailer of a tractor trailer. The system includes an elevation system for elevating a front end of the trailer with respect to a rear end of the trailer, a collection conveyor for receiving objects from the elevated trailer and for controlling a rate of removal of objects from the elevated trailer, and an evacuation conveyor pivotally coupled to the collection conveyor for receiving the objects from the collection conveyor.

Those skilled in the art will appreciate that numerous modifications and variations may be made to the above disclosed embodiments without departing from the spirit and scope of the present invention.

What is claimed is:

1. A system for receiving a plurality of objects from an elevated trailer of a tractor trailer, said system comprising a collection conveyor extending between a base end and a coupled end, the coupled end being rotatably coupled to an evacuation conveyor, said collection conveyor including an object facing surface between the base end and the coupled end for receiving the plurality of objects, said collection conveyor being rotatably adjustable with respect to the evacuation conveyor at the coupled end, and both the evacuation conveyor and the coupled end of the collection conveyor being elevationally adjustable.

2. The system as claimed in claim 1, wherein the collection conveyor spans a width of the trailer of the tractor trailer.

3. The system as claimed in claim 1, wherein the collection conveyor is rotatable with respect to the evacuation conveyor to provide an angle with respect to horizontal of between a first angle of about 5 degrees and a second angle about 95 degrees.

4. The system as claimed in claim 3, wherein the collection conveyor spans a height of the trailer of the tractor trailer when rotated to the second angle.

5. The system as claimed in claim 1, wherein said coupled end of the collection conveyor is higher in elevation than the base end of the collection conveyor when the collection conveyor initially engages the plurality of objects in the trailer of the tractor trailer.

6. The system as claimed in claim 1, wherein the collection conveyor includes an active belt conveyor.

7. The system as claimed in claim 1, wherein the collection conveyor includes an active roller conveyor.

8. The system as claimed in claim 1, wherein the evacuation conveyor includes an elevation system that elevationally adjusts the evacuation conveyor together with the coupled end of the collection conveyor.

9. The system as claimed in claim 1, wherein the evacuation conveyor includes a ramp section that couples with a facilities conveyor, the ramp section providing an elevation drop to the facilities conveyor.

10. The system as claimed in claim 9, wherein the system includes a dynamic engagement assembly such that the ramp section may dynamically engage the facilities conveyor as the evacuation conveyor is raised and lowered.

11. The system as claimed in claim 10, wherein the dynamic engagement assembly includes rollers, and wherein the ramp section includes a tapered width that narrows toward the facilities conveyor.

12. The system as claimed in claim 1, wherein the system further includes at least one upper trailer engagement perception unit directed toward an upper area of the plurality of objects.

13. The system as claimed in claim 1, wherein the system further includes at least one lower trailer engagement perception unit directed toward a lower area of the plurality of objects.

14. A system for receiving a plurality of objects from an elevated trailer of a tractor trailer, said system comprising a collection conveyor extending between a base end and a coupled end, the collection conveyor being adapted to retain the plurality of objects within the tractor trailer when the collection conveyor is in a first position with respect to the tractor trailer, and to permit the plurality of objects to travel up the collection conveyor when the collection conveyor is in a second position with respect to the tractor trailer.

15. The system as claimed in claim 14, wherein said collection conveyor is rotatably adjustable with respect to an evacuation conveyor at a coupled end thereof.

16. The system as claimed in claim 15, wherein both the evacuation conveyor and the coupled end of the collection conveyor are elevationally adjustable.

17. The system as claimed in claim 14, wherein the collection conveyor spans a width of the trailer of the tractor trailer.

18. The system as claimed in claim 15, wherein the collection conveyor is rotatable with respect to the evacuation conveyor to provide an angle with respect to horizontal of between a first angle of about 5 degrees and a second angle about 95 degrees.

19. The system as claimed in claim 18, wherein the collection conveyor spans a height of the trailer of the tractor trailer when rotated to the second angle.

20. The system as claimed in claim 14, wherein said coupled end of the collection conveyor is higher in elevation than the base end of the collection conveyor when the collection conveyor initially engages the plurality of objects in the trailer of the tractor trailer.

21. The system as claimed in claim 14, wherein the collection conveyor includes an active belt conveyor.

22. The system as claimed in claim 14, wherein the collection conveyor includes an active roller conveyor.

23. The system as claimed in claim 15, wherein the evacuation conveyor includes an elevation system that elevationally adjusts the evacuation conveyor together with the coupled end of the collection conveyor.

24. The system as claimed in claim 15, wherein the evacuation conveyor includes a ramp section that couples with a facilities conveyor, the ramp section providing an elevation drop to the facilities conveyor.

25. The system as claimed in claim 24, wherein the system includes a dynamic engagement assembly such that the ramp section may dynamically engage the facilities conveyor as the evacuation conveyor is raised and lowered.

26. The system as claimed in claim 25, wherein the dynamic engagement assembly includes rollers, and wherein the ramp section includes a tapered width that narrows toward the facilities conveyor.

27. The system as claimed in claim 14, wherein the system further includes at least one upper trailer engagement perception unit directed toward an upper area of the plurality of objects.

28. The system as claimed in claim 14, wherein the system further includes at least one lower trailer engagement perception unit directed toward a lower area of the plurality of objects.

29. A method of receiving a plurality of objects from an elevated trailer of a tractor trailer, said method comprising:
  urging a collection conveyor against the plurality of objects from a rear of the trailer;
  elevating the trailer such that the rear of the trailer is lower than a front of the trailer;
  retaining the plurality of objects within the trailer with the collection conveyor;
  lowering an upper portion of the collection conveyor; and
  permitting the plurality of objects to move upward along the collection conveyor to an evacuation conveyor.

30. The method as claimed in claim 29, wherein the method further includes attaching a base end of the collection conveyor to an anchor area proximate a floor of the trailer and the rear of the trailer.

31. The method as claimed in claim 29, wherein the method further includes detecting force against the collection conveyor and providing collection conveyor force data.

32. The method as claimed in claim 31, wherein the method further includes adjusting an elevation of the trailer of the tractor trailer responsive to the collection conveyor force data.

33. The method as claimed in claim 29, where the method further includes rotating the collection conveyor with respect to the evacuation conveyor at a coupled end of the collection conveyor.

34. The method as claimed in claim 33, wherein the method further includes changing the elevation of the evacuation conveyor and the coupled end of the collection conveyor.

35. The method as claimed in claim 29, wherein the evacuation conveyor includes an elevation system that elevationally adjusts the evacuation conveyor together with the coupled end of the collection conveyor.

36. The method as claimed in claim 35, wherein the evacuation conveyor includes a ramp section that couples with a facilities conveyor, the ramp section providing an elevation drop to the facilities conveyor.

37. The method as claimed in claim 36, wherein the method further includes dynamically engaging the facilities conveyor with the ramp section using a dynamic engagement assembly as the evacuation conveyor is raised and lowered.

38. The method as claimed in claim 37, wherein the dynamic engagement assembly includes rollers, and wherein the ramp section includes a tapered width that narrows toward the facilities conveyor.

39. A system for emptying contents of a trailer of a tractor trailer, said system comprising:
- an elevation system for elevating a front end of the trailer with respect to a rear end of the trailer;
- a collection conveyor for receiving objects from the elevated trailer and for controlling a rate of removal of objects from the elevated trailer; and
- an evacuation conveyor pivotally coupled to the collection conveyor for receiving the objects from the collection conveyor, wherein the evacuation conveyor is elevationally adjustable as the collection conveyor is rotated with respect to the evacuation conveyor.

40. The system as claimed in claim 39, wherein the collection conveyor spans a width of the trailer of the tractor trailer.

41. The system as claimed in claim 39, wherein the collection conveyor is rotatable with respect to the evacuation conveyor to provide an angle with respect to horizontal of between a first angle of about 5 degrees and a second angle about 95 degrees.

42. The system as claimed in claim 41, wherein the collection conveyor spans a height of the trailer of the tractor trailer when rotated to the second angle.

43. The system as claimed in claim 39, wherein said coupled end of the collection conveyor is higher in elevation than the base end of the collection conveyor when the collection conveyor initially engages the plurality of objects in the trailer of the tractor trailer.

44. The system as claimed in claim 39, wherein the collection conveyor includes an active belt conveyor.

45. The system as claimed in claim 39, wherein the collection conveyor includes an active roller conveyor.

46. The system as claimed in claim 39, wherein the evacuation conveyor includes an elevation system that elevationally adjusts the evacuation conveyor together with the coupled end of the collection conveyor.

47. The system as claimed in claim 39, wherein the evacuation conveyor includes a ramp section that couples with a facilities conveyor, the ramp section providing an elevation drop to the facilities conveyor.

48. The system as claimed in claim 47, wherein the system includes a dynamic engagement assembly such that the ramp section may dynamically engage the facilities conveyor as the evacuation conveyor is raised and lowered.

49. The system as claimed in claim 48, wherein the dynamic engagement assembly includes rollers, and wherein the ramp section includes a tapered width that narrows toward the facilities conveyor.

50. The system as claimed in claim 39, wherein the system further includes at least one upper trailer engagement perception unit directed toward an upper area of the plurality of objects.

51. The system as claimed in claim 39, wherein the system further includes at least one lower trailer engagement perception unit directed toward a lower area of the plurality of objects.

* * * * *